United States Patent
Dvorak et al.

[19]

[11] Patent Number: 6,133,542

[45] Date of Patent: Oct. 17, 2000

[54] PROCESS FOR COATING OR WELDING EASILY OXIDIZED MATERIALS AND PLASMA TORCH FOR CARRYING OUT THIS PROCESS

[75] Inventors: Michael Dvorak, Allemendingen, Switzerland; Patrice Robert, Evian-les-Bains, France

[73] Assignee: Castolin S.A., St. Sulpice, Switzerland

[21] Appl. No.: 09/214,352

[22] PCT Filed: Jul. 3, 1997

[86] PCT No.: PCT/EP97/03487

§ 371 Date: Sep. 20, 1999

§ 102(e) Date: Sep. 20, 1999

[87] PCT Pub. No.: WO98/01256

PCT Pub. Date: Jan. 15, 1998

[30] Foreign Application Priority Data

Jul. 4, 1996 [DE] Germany .......................... 196 26 941

[51] Int. Cl.[7] ...................................... B23K 10/00

[52] U.S. Cl. .................. 219/121.47; 219/121.46; 219/121.54; 219/121.57; 219/76.16

[58] Field of Search .................. 219/121.47, 121.52, 219/121.54, 121.57, 121.51, 74, 75, 76.16, 121.46

[56] References Cited

U.S. PATENT DOCUMENTS 4,125,754 11/1978 Wasserman et al. ...................... 219/76
4,983,807 1/1991 Yamada et al. .
5,686,001 11/1997 Wrabel et al. ...................... 219/130.51

*Primary Examiner*—Mark Paschall
*Attorney, Agent, or Firm*—Bachman & LaPointe, P.C.

[57] ABSTRACT

A process for coating or welding easily oxidized materials is carried out by applying weld metal powder by a plasma powder welding process with an alternating current or with a direct current and a superimposed alternating current as welding current to generate a plasma arc for the powder welding process. For this purpose, one base of the plasma arc is produced in a spherical recess (34) of an electrode (32).

26 Claims, 1 Drawing Sheet

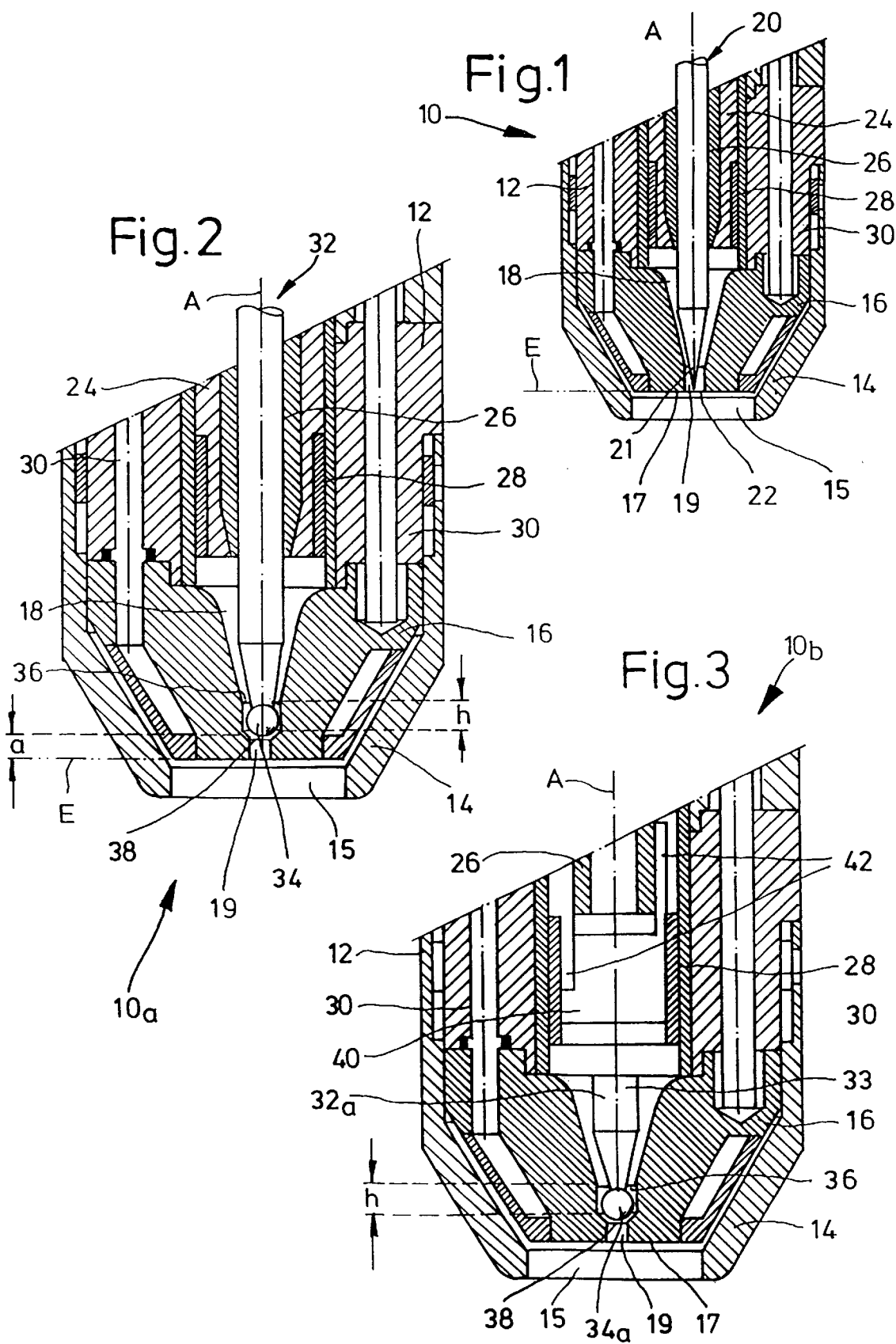

PROCESS FOR COATING OR WELDING EASILY OXIDIZED MATERIALS AND PLASMA TORCH FOR CARRYING OUT THIS PROCESS

The invention concerns a method of coating materials by plasma powder build-up welding of additive materials in powder form. In addition the invention concerns a plasma torch with bar-type cathode and a gas duct of a burner nozzle, the gas duct surrounding the cathode and a nozzle opening of narrower cross-section being arranged downstream of the gas duct, and a method of coating the bar-type cathode or a cathode portion.

The operation of coating iron-based materials with materials in powder form on a nickel, cobalt and/or copper basis has long been implemented in industry. When applying materials which oxidise easily such as for example aluminum, titanium or alloys thereof, the coating operation is very severely disturbed and possibly rendered entirely impossible to implement, due to the oxides which are formed at the surface.

Even attempts to conduct those operations under a protective gas failed. The only possible way of implementing such a coating operation is the very expensive and complicated procedure of operating under vacuum, which has never resulted in use on a large technical scale.

In accordance with JP-A-03 248777 a welding current is produced between a non-consumable electrode and a plate comprising an aluminum alloy by an alternating current source. The aluminum alloy contains between 15 and 55% by weight of Cu and serves as a build-up material, for the formation of which an alternating current plasma arc is used.

EP-A-0 452 494 describes a plasma torch with a cylindrical electrode and an insert portion disposed therein. The end edges of the electrode are slightly rounded in an embodiment which forms part of the state of the art.

DE-A-35 44 657 discloses a heavy-current electrode comprising a heat-conducting and current-conducting material, which has a coating to reduce burning-away of the electrode on the main body of the electrode. That coating is applied by a plasma spraying process. The spraying powder mixture for the coating comprises W and at least 4% by weight of $ThO_2$ or $CeO_2$ or W and at least 1% by weight of oxides, carbides or borides with a high melting temperature and a low electron work function.

In consideration of that factor the inventor has set himself the object of permitting coating of materials which oxidise easily—in particular light metals or alloys—in a simple and inexpensive fashion.

That object is attained by the teachings of the independent claims; the appendant claims set forth preferred configurations.

In accordance with the invention—after numerous attempts at applying to an aluminum alloy a coating with an additive material in powder form by means of powder build-up welding with a plasma transferred arc (referred to as PTA)—there is proposed the use of an alternating current in a frequency range of between about 10 and 100 Hz or a direct current as an energy carrier with a superimposed alternating current at a frequency of between about 10 and 1000 Hz or in the frequency range of between about 1 and 200 KHz; in this case a base point of the plasma arc is to be produced at a spherical or ball-shaped portion formed on an electrode, prior to use thereof. By virtue of that procedure, the oxide skin which is formed due to the oxygen in the air or the residual oxygen in the protective gas, at the surface of the base material or of the additive material in powder form, is destroyed or broken up, and it becomes possible to carry out coating operations even on or with those easily oxidising materials, and to achieve a good weld quality.

It is also advantageous to endeavour to achieve a high degree of mixing with the base material and also it is advantageous in accordance with the invention to so select the flow speed of the issuing gases that the slags or oxides which are formed by virtue of the residual oxygen are torn by the gas flow and deposited at the edge of the molten bath.

Also in accordance with the invention is a plasma torch with a gas duct of a burner nozzle, the gas duct being arranged upstream of a nozzle opening of narrower cross-section, and with a bar-type cathode which is provided at its end with the rounded shaped portion and in particular is of a spherical configuration, for operation with a superimposed alternating current, for transfer of the plasma.

A plasma torch for a transferred arc of the kind set forth in the opening part of this specification, with a round bar electrode—disposed upstream of a chamber arranged upstream of the nozzle opening—, with the electrode having a free end which is bevelled therearound, is admittedly known from EP-A-0 452 494. There is however no reference therein to the solution in accordance with the invention which is proffered here.

In the plasma torch according to the application the bulging shaped portion of the cathode can be so arranged that it touches a plane determined by the end face of an anode surrounding the cathode, or projects outwardly beyond that plane by a short distance, about at most between 3 and 4 mm.

A preferred arrangement has a cathode which is set back into the gas duct of the torch nozzle and whose spherical configuration portion is then at a short spacing—also of at most 4 mm—relative to that plane and at a gap spacing relative to a shoulder step which forms a transition between the gas duct and the following nozzle opening of narrower cross-section. That ring-like shoulder step is adjoined by a cylindrical portion of the gas duct as a receiving means for the shaped configuration of the cathode and with same and the shoulder step defines the passage for the gas to pass therethrough.

It has proven to be desirable for the cathode which is supplied with an alternating current or with a direct current with superimposed alternating current to be equipped with water cooling. The cathode can be for example in the form of a water-cooled support body with interchangeably fitted cathode portion—of material with a high melting point and with a low level of thermal conductivity—for the shaped configuration or for the base point of the arc; the support body is advantageously formed from copper or a copper alloy.

Further advantages, features and details of the invention will be apparent from the description hereinafter of preferred embodiments and with reference to the drawing; the drawing shows views in partial longitudinal section through the head of a torch nozzle for coating or welding easily oxidisable additive substances in powder form. In the drawing:

FIGS. 1 and 2 each show a pin cathode with a three-dimensionally formed base point for a plasma arc.

On a torch nozzle 10, fitted on to a nozzle body 12 is a protective gas cap 14 which extends around an anode 16. Extending on the longitudinal axis A of the torch nozzle 10 in FIG. 1 is a bar-shaped cathode 20 which passes through an axial gas duct 18 in the anode 16. The cathode terminates with a shaped portion 34 thereon, at a plane E in the proximity of a passage 15 in the protective gas cap 14, the plane E being defined by the mouth opening 22 of the gas duct 18 or by the end face 17—see FIG. 2—of the anode 16. The shaped portion 34 is disposed at a cylindrical nozzle opening 19 of the gas duct 18 at a spacing a of about 3 mm relative to the plane E defined by the mouth opening of the gas duct, in a cylindrical portion 36 of a height h of the gas duct 18 and at a gap spacing relative to an inclined shoulder ring 38. At the latter, the cylindrical portion 36 of the gas duct 18 which tapers outside of the latter forms the transition into the cylindrical nozzle opening 19 which is of smaller diameter in relation to the cylindrical portion 36.

Associated with the cathode 20 are contact portions 26 which are provided within a cylindrical clamping device 24 and which rest with their clamping device 24 in an insulation 28. The latter is in turn disposed in the nozzle body 12. Water coolant ducts 30 which extend parallel to the axis are to be seen in the nozzle body 12, at a spacing relative to the insulation 28.

In the configuration of a torch nozzle $10_a$ as shown in FIG. 2 the cathode 32 includes a cathode portion in the form of a short pin-type cathode 33 of material with a high melting point and with a low level of thermal conductivity for the rounded shaped portion $34_a$. The cathode portion 33 is axially screwed to a support body 40 of copper. The latter is connected to a water coolant arrangement 42.

Not shown is an embodiment in which the shaped portion 34 projects beyond the end face 17 or the plane E by a dimension of up to 4 mm, preferably up to 3 mm.

When a current is applied, during the plasma powder build-up welding procedure, the shaped portion 34, $34_a$ becomes the base point of the plasma arc produced. The pin cathode 20, 33 which is formed for example from tungsten or a tungsten alloy is operated with alternating current in a frequency range of between 10 and 100 Hz.

What is claimed is:

1. A process for coating oxidizable materials by plasma build-up welding of powdered additives with a plasma transferred arc which comprises applying a current selected from the group consisting of an alternating current of a frequency between about 10 to 100 Hz and a direct current which is super imposed with alternating current of a frequency between about 10 Hz to 200 KHz for generating the plasma transferred arc for powdered hard surfacing wherein a base point of the plasma arc is produced at a spherical position formed on an electrode.

2. A process according to claim 1 wherein the superimposed alternating current is at a frequency of between about 10 to 100 Hz.

3. A process according to claim 1 wherein the superimposed alternating current is at a frequency of 1000 between about 1 and 200 KHz.

4. A process according to claim 1 wherein superimposed on the direct current is a medium-frequency voltage as the alternating current.

5. A process according to claim 1 wherein superimposed on the direct current is a high-frequency voltage as the alternating current.

6. A process according to claim 1 wherein superimposed on the direct current is a rectangular voltage as the alternating current.

7. A process according to claim 1 including conducting flow of the gases at controlled flow velocity, such that oxides produced are broken up and moved to the edge of a resulting molten bath.

8. A process according to claim 1 wherein a coating of an anti-abrasion layer of the following composition is produced: Si 5.0 percent by weight; Cu 3.0 percent by weight; Mg 0.5 percent by weight; remainder Al.

9. A plasma burner with rod-type cathode as well as a gas channel of a burner nozzle enclosing this cathode, which burner nozzle is followed by a nozzle opening with a more narrow cross-section, for implementing the process according to claim 1 wherein the spherical portion is formed on the cathode of the plasma burner towards the end thereof.

10. A plasma burner according to claim 9 wherein the spherical portion on the cathode is roughly tangent to a plane (E), which is determined by the front surface of an anode assigned to the cathode and containing the nozzle opening.

11. A plasma burner according to claim 9 wherein the spherical portion on the cathode rises above a plane (E) at a distance, wherein the plane is determined by the front surface of an anode assigned to the cathode and containing the nozzle opening.

12. A plasma burner according to claim 9 wherein the spherical portion on the cathode lies within an anode enclosing the latter and containing the nozzle opening at a distance (a) from a plane (E), which is determined by the front surface of the anode.

13. A plasma burner according to claim 11 wherein the distance between the spherical portion and the front surface (17) is 4 mm at most.

14. A plasma burner according to claim 12 wherein the distance between the spherical portion and the plane (E) is 4 mm at most.

15. A plasma burner according to claim 9 wherein a transition between a gas channel and the narrow nozzle opening comprises a shoulder recess which faces the spherical portion on the cathode at a gap distance.

16. A plasma burner according to claim 10 wherein a transition between a gas channel and the narrow nozzle opening comprises a shoulder recess which faces the spherical portion on the cathode at a gap distance.

17. A plasma burner according to claim 11 wherein a transition between a gas channel and the narrow nozzle opening comprises a shoulder recess which faces the spherical portion on the cathode at a gap distance.

18. A plasma burner according to claim 12 wherein a transition between a gas channel and the narrow nozzle opening comprises a shoulder recess which faces the spherical portion on the cathode at a gap distance.

19. A plasma burner according to claim 15 wherein a cylindrical section of the gas channel is connected to a ring-type shoulder recess as the seat for the spherical portion on the cathode.

20. A plasma burner for generating an arc according to claim 9 wherein the cathode determines the base point of the arc.

21. A plasma burner according to claim 9 wherein the cathode which is subjected to the current is water-cooled.

22. A plasma burner according to claim 20 wherein the cathode has a water-cooled supporting body and an interchangeably connected cathode part made of high-melting material with low thermal conductivity for the base point of the arc wherein the supporting body comprises copper.

23. A plasma burner according to claim 22 wherein the interchangeable cathode part comprises tungsten for infiltration and tungsten as an impregnating material.

24. A plasma burner according to claim 23 wherein the tungsten for the interchangeable cathode part is alloyed with thorium.

25. A plasma burner according to claim 22 wherein the interchangeable cathode part is manufactured from a high-melting material selected from the group consisting of nitride, carbide, boride, silicide, titanium carbide, and titanium carbide sintered alloy.

26. A plasma burner according to claim 22 wherein the interchangeable cathode part is manufactured with an impregnating material with a low sputter rate.

* * * * *